(12) United States Patent
Tiberg

(10) Patent No.: US 8,977,415 B2
(45) Date of Patent: Mar. 10, 2015

(54) USE OF ON-VEHICLE ACCELEROMETER TO ESTIMATE VEHICLE GRADE AND MASS WHILE VEHICLE IS IN MOTION

(75) Inventor: Richard L. Tiberg, Milford, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 590 days.

(21) Appl. No.: 13/196,329

(22) Filed: Aug. 2, 2011

(65) Prior Publication Data

US 2013/0035829 A1 Feb. 7, 2013

(51) Int. Cl.
*G06F 7/00* (2006.01)
*G06F 19/00* (2011.01)

(52) U.S. Cl.
USPC ............. 701/22; 701/33.4; 701/55; 701/56; 180/6.48

(58) Field of Classification Search
USPC .......... 701/55–56, 102, 65, 33.4, 37, 90, 120, 701/35, 22; 73/865; 702/175; 180/6.48
See application file for complete search history.

(56) References Cited

U.S. PATENT DOCUMENTS

| 4,789,936 | A * | 12/1988 | Kurihara et al. | 701/56 |
|---|---|---|---|---|
| 6,275,760 | B1 * | 8/2001 | Saito et al. | 701/55 |
| 6,438,510 | B2 * | 8/2002 | Zhu et al. | 702/175 |
| 6,516,261 | B2 * | 2/2003 | Ohashi et al. | 701/51 |
| 7,499,784 | B2 | 3/2009 | Kresse | |
| 8,670,887 | B2 * | 3/2014 | Nishimori et al. | 701/22 |
| 8,775,041 | B2 * | 7/2014 | Kresse et al. | 701/56 |
| 8,849,528 | B2 * | 9/2014 | Palmer | 701/55 |
| 2008/0249693 | A1 | 10/2008 | Kresse | |
| 2010/0250056 | A1 * | 9/2010 | Perkins | 701/35 |
| 2011/0288908 | A1 * | 11/2011 | Greiner et al. | 705/7.38 |
| 2012/0083980 | A1 * | 4/2012 | Kresse et al. | 701/56 |
| 2014/0019022 | A1 * | 1/2014 | Kresse et al. | 701/56 |

FOREIGN PATENT DOCUMENTS

| CN | 101328969 A | 12/2008 |
|---|---|---|
| CN | 101844554 A | 9/2010 |

OTHER PUBLICATIONS

Node self-positioning in wireless sensor networks using graded estimation and Taylor-Series algorithm;Yanzhi Hu ; Dawei Ma ; Tian Tian; Intelligent Control and Automation, 2008. WCICA 2008. 7th World Congress on; Digital Object Identifier: 10.1109/WCICA. 2008.4593945; Publication Year: 2008 , pp. 6711-6714.*

(Continued)

*Primary Examiner* — Cuong H Nguyen

(57) ABSTRACT

A system includes a grade estimation module that receives an accelerometer value and generates a grade estimate based on the accelerometer value, wherein the accelerometer value corresponds to acceleration of a vehicle and the grade estimate corresponds to a grade of the vehicle. A mass estimation module receives the accelerometer value and generates a mass estimate based on the accelerometer value, wherein the mass estimate corresponds to a mass of the vehicle. A shift control module at least one of selects and adjusts one of a plurality of shift schedules based on at least one of the grade estimate and the mass estimate and controls a transmission of the vehicle based on the one of the plurality of shift schedules.

20 Claims, 3 Drawing Sheets

(56) References Cited

OTHER PUBLICATIONS

Simultaneous mass and time-varying grade estimation for heavy-duty vehicles; Vahidi, A. ; Druzhinina, M. ; Stefanopoulou, A. ; Huei Peng; American Control Conference, 2003. Proceedings of the 2003; vol.: 6; Digital Object Identifier: 10.1109/ACC.2003.1242508; Publication Year: 2003 , pp. 4951-4956 vol. 6.*

A Two-Stage Lyapunov-Based Estimator for Estimation of Vehicle Mass and Road Grade; McIntyre, M.L. ; Ghotikar, T.J. ; Vahidi, A. ; Xubin Song ; Dawson, D.M. ;Vehicular Technology, IEEE Transactions on; vol. 58 , Issue: 7; Digital Object Identifier: 10.1109/TVT.2009.2014385; Publication Year: 2009 , pp. 3177-3185.*

Real-Time Estimation of Vehicle Mass and Road Grade Based on Multi-Sensor Data Fusion; Xiaobin Zhang ; Liangfei Xu ; Jianqiu Li ; Minggao Ouyang; Vehicle Power and Propulsion Conference (VPPC), 2013 IEEE; Digital Object Identifier: 10.1109/VPPC.2013.6671743; Publication Year: 2013 , pp. 1-.*

HEV diffusion forecast by key device analysis; Yamaguchi, N. ; Minami, S.; Electric Vehicle Symposium and Exhibition (EVS27), 2013 World; DOI: 10.1109/EVS.2013.6914724; Publication Year: 2013 , pp. 1-7.*

Design of automatic shifting controller for electric vehicle with five speed transmission; Xu Jingbo ; Xu Xiaohong ; Su Xin ; Guo Xin Strategic Technology (IFOST), 2013 8th International Forum on; Volume: 1; DOI: 10.1109/IFOST.2013.6616982 Publication Year: 2013 , pp. 294-297.*

Video based adaptive road traffic signaling; Indu, S. ; Nair, V. ; Jain, S. ; Chaudhury, S.; Distributed Smart Cameras (ICDSC), 2013 Seventh International Conference on; DOI: 10.1109/ICDSC.2013.6778234; Publication Year: 2013 , pp. 1-6.*

Average-Speed Forecast and Adjustment via VANETs; Jyun-Yan Yang ; Li-Der Chou ; Chi-Feng Tung ; Shu-Min Huang ; Tong-Wen Wang; Vehicular Technology, IEEE Transactions on; vol. 62 , Issue: 9; DOI: 10.1109/TVT.2013.2267210 Publication Year: 2013 , pp. 4318-4327.*

Performance assessment of a low-cost inertial measurement unit based ultra-tight global navigation satellite system/inertial; navigation system integration for high dynamic applications;Feng Qin ; Xingqun Zhan ; Lei Zhan; Radar, Sonar & Navigation, IET vol. 8 , Issue: 7;DOI: 10.1049/iet-rsn.2013.0217; Publication Year: 2014 , pp. 828-883.*

Neuro fuzzy transmission control for automobile with variable loads; Hayashi, K. ; Shimizu, Y. ; Dote, Y. ; Takayama, A. ; Hirako, A. Control Systems Technology, IEEE Trans. on; vol. 3 , Issue: 1; DOI: 10.1109/87.370709; Pub. Year: 1995 , pp. 49-53.*

Neuro fuzzy optimal transmission control for automobile with variable loads; Hayashi, K. ; Shimizu, Y. ; Nakamura, S. ; Dote, Y. ; Takayama, A. ; Hirako, A;Industrial Electronics, Control, and Instrumentation, 1993. Proceedings of the IECON '93., International Conference on; DOI: 10.1109/IECON.1993.339039; Pub. Year: 1993 , pp. 430-434.*

\* cited by examiner

USE OF ON-VEHICLE ACCELEROMETER TO ESTIMATE VEHICLE GRADE AND MASS WHILE VEHICLE IS IN MOTION

FIELD

The present disclosure relates to estimating grade and mass of a vehicle, and more particularly to using the estimated grade and mass to control operation of the vehicle.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

A vehicle may include an onboard accelerometer. The accelerometer provides acceleration data to one or more vehicle systems. For example, the vehicle may implement systems including, but not limited to, an anti-lock braking system and an electronic stability control system. The accelerometer provides the acceleration data to the anti-lock braking system and the electronic stability control system, which operate according to the acceleration data.

SUMMARY

A system includes a grade estimation module that receives an accelerometer value and generates a grade estimate based on the accelerometer value. The accelerometer value corresponds to acceleration of a vehicle and the grade estimate corresponds to a grade of the vehicle. A mass estimation module receives the accelerometer value and generates a mass estimate based on the accelerometer value. The mass estimate corresponds to a mass of the vehicle. A shift control module at least one of selects and adjusts one of a plurality of shift schedules based on at least one of the grade estimate and the mass estimate and controls a transmission of the vehicle based on the one of the plurality of shift schedules.

A method includes receiving an accelerometer value, generating a grade estimate based on the accelerometer value, wherein the accelerometer value corresponds to acceleration of a vehicle and the grade estimate corresponds to a grade of the vehicle, generating a mass estimate based on the accelerometer value, wherein the mass estimate corresponds to a mass of the vehicle, at least one of selecting and adjusting one of a plurality of shift schedules based on at least one of the grade estimate and the mass estimate, and controlling a transmission of the vehicle based on the one of the plurality of shift schedules.

Further areas of applicability of the present disclosure will become apparent from the detailed description provided hereinafter. It should be understood that the detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

DETAILED DESCRIPTION

Figure 1:
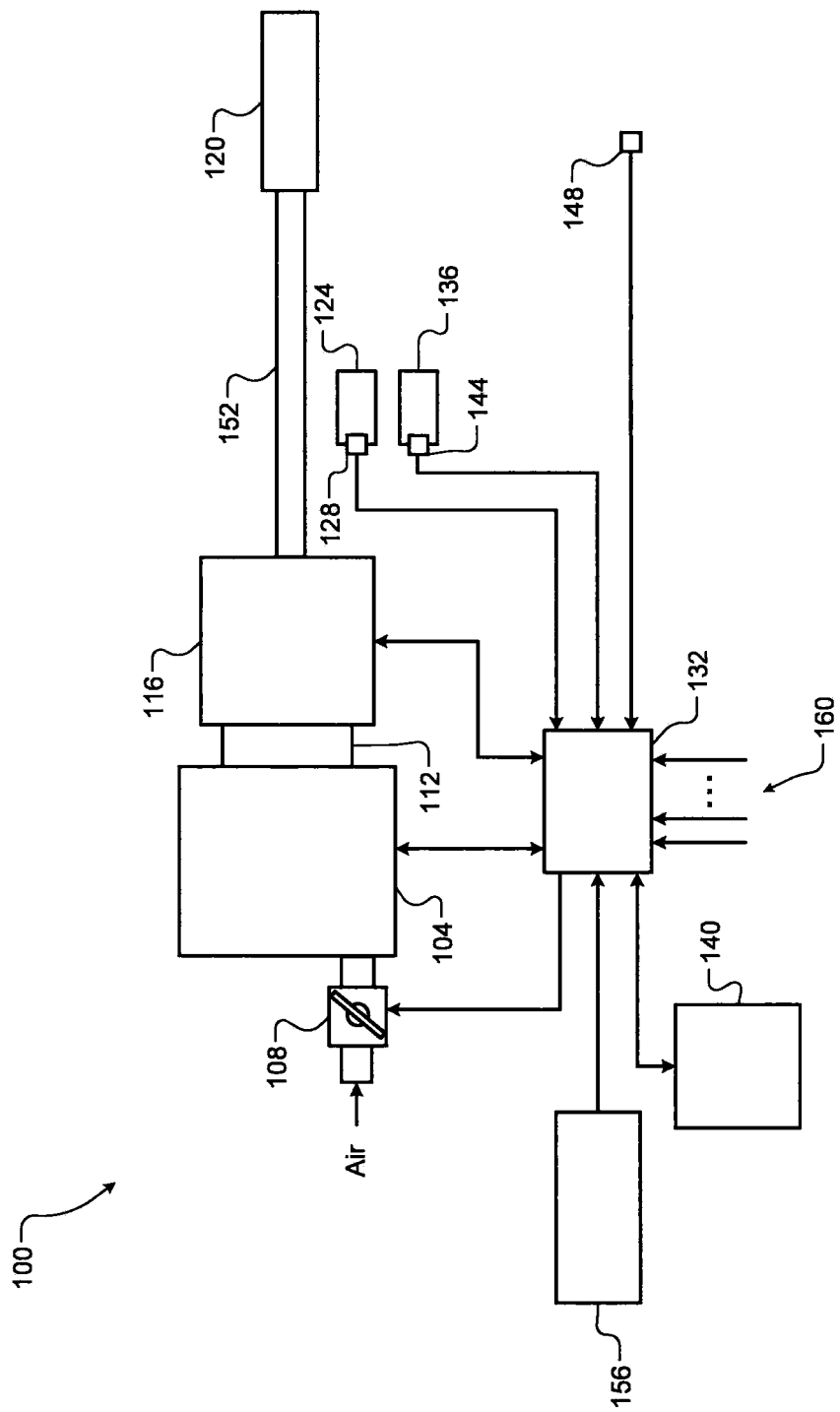
FIG. 1 is a functional block diagram of a vehicle according to the present disclosure.

The following description is merely illustrative in nature and is in no way intended to limit the disclosure, its application, or uses. For purposes of clarity, the same reference numbers will be used in the drawings to identify similar elements. As used herein, the phrase at least one of A, B, and C should be construed to mean a logical (A or B or C), using a non-exclusive logical or. It should be understood that steps within a method may be executed in different order without altering the principles of the present disclosure.

As used herein, the term module may refer to, be part of, or include an Application Specific Integrated Circuit (ASIC); an electronic circuit; a combinational logic circuit; a field programmable gate array (FPGA); a processor (shared, dedicated, or group) that executes code; other suitable components that provide the described functionality; or a combination of some or all of the above, such as in a system-on-chip. The term module may include memory (shared, dedicated, or group) that stores code executed by the processor.

The term code, as used above, may include software, firmware, and/or microcode, and may refer to programs, routines, functions, classes, and/or objects. The term shared, as used above, means that some or all code from multiple modules may be executed using a single (shared) processor. In addition, some or all code from multiple modules may be stored by a single (shared) memory. The term group, as used above, means that some or all code from a single module may be executed using a group of processors or a group of execution engines. For example, multiple cores and/or multiple threads of a processor may be considered to be execution engines. In various implementations, execution engines may be grouped across a processor, across multiple processors, and across processors in multiple locations, such as multiple servers in a parallel processing arrangement. In addition, some or all code from a single module may be stored using a group of memories.

The apparatuses and methods described herein may be implemented by one or more computer programs executed by one or more processors. The computer programs include processor-executable instructions that are stored on a non-transitory tangible computer readable medium. The computer programs may also include stored data. Non-limiting examples of the non-transitory tangible computer readable medium are nonvolatile memory, magnetic storage, and optical storage.

Referring now to FIG. 1, a vehicle 100 includes an engine 104. The engine 104 combusts an air and fuel mixture within cylinders (not shown) to produce drive torque. Air is drawn into the engine 104 through a throttle 108. A torque converter 112 transfers and multiplies torque from the engine 104 and provides the torque to a transmission 116. The transmission 116 operates in one or more gear ratios to transfer the torque to a driveline 120.

An accelerator pedal 124 enables a driver of the vehicle 100 to adjust the position of the throttle 108 to achieve a desired speed. An accelerator pedal position sensor 128 generates a pedal signal indicating a position of the accelerator pedal 124. A control module 132 receives the pedal signal and adjusts the position of the throttle 108 accordingly, which adjusts airflow into the engine 104. The control module 132 adjusts fuel delivery to the engine 104 based on the airflow. Similarly, a brake pedal 136 allows the driver to control a brake system 140. The brake system 140 applies a braking torque to counter the drive torque. A brake pedal sensor 144 senses the position of the brake pedal 136 and generates a brake pedal signal accordingly. The control module 132 receives the signal and controls the brake system 140 of the vehicle 100. A vehicle speed sensor 148 generates a vehicle speed signal by sensing a rotational speed of at least one of a wheel (not shown) and a driveshaft 152. The control module 132 determines a vehicle speed from the vehicle speed signal and/or the vehicle speed sensor 148.

The vehicle 100 includes an accelerometer module 156. For example only, the accelerometer module 156 implements a longitudinal accelerometer. The accelerometer module 156 measures acceleration forces of the vehicle 100 and generates an accelerometer value accordingly. The accelerometer value corresponds to the acceleration of the vehicle. The accelerometer module 156 outputs a vehicle acceleration signal according to the accelerometer value.

The control module 132 receives the vehicle acceleration signal and estimates grade (e.g. changes in grade of the vehicle due to terrain) and mass of the vehicle 100 based on the vehicle acceleration signal and one or more other values. For example, the one or more other values may correspond to measured values (e.g. measured values received by the control module 132 via signals 160) and/or predetermined values (e.g. predetermined values stored by the control module 132). The one or more other values include, but are not limited to, a vehicle speed, a measured rate of change of vehicle speed, a gravitational constant, tractive force of the vehicle 100, an aerodynamic coefficient of the vehicle 100, a rolling load of the vehicle 100, and/or braking force.

The control module 132 uses the grade and mass estimates of the vehicle 100 to control various vehicle operating parameters. For example, the control module 132 may more accurately control transmission shift schedule (e.g. in tow/haul situations) and grade braking using the grade and mass estimates.

Figure 2:
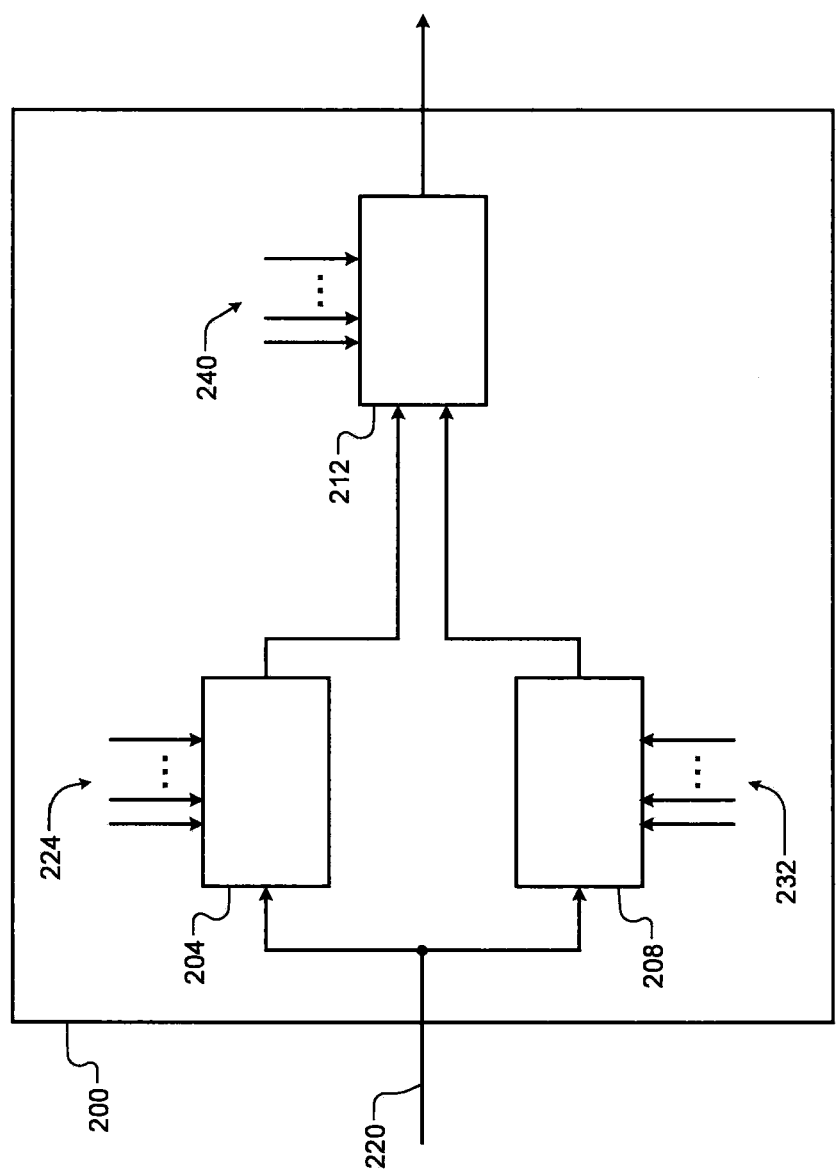
FIG. 2 is a functional block diagram of a control module according to the present disclosure.

Referring now to FIG. 2, a control module 200 according to the present disclosure may include a grade estimation module 204, a mass estimation module 208, and a shift control module 212. Although the control module 200 is shown to include the shift control module 212, other modules may be included to control one or more other vehicle operating parameters using the grade and mass estimates.

The grade estimation module 204 receives vehicle acceleration signal 220 (e.g. from the accelerator module 156) and one or more other signals 224. The other signals 224 may be received from components of the vehicle 100 external to the control module 200 and/or be predetermined values stored within the control module 200. The other signals 224 include, but are not limited to, a gravitational constant and a rate of change of vehicle speed. The rate of change of vehicle speed may be a measured value, and/or the grade estimation module 204 may calculate the rate of change of vehicle speed based on vehicle speed measurements.

The grade estimation module 204 generates the grade estimate based on the vehicle acceleration signal 220, the rate of change of vehicle speed, and the gravitational constant and provides the grade estimate to the shift control module 212. For example only, the grade estimation module 204 generates the grade estimate as a grade percentage according to:

$$\text{Grade } \% = \left(\arctan\left(\sin\left(\frac{(\text{acceleration} - \text{rate})}{grav}\right)\right)\right) * 100$$

where acceleration corresponds to the vehicle acceleration signal 220, rate corresponds to the rate of change of vehicle speed, and gray corresponds to the gravitational constant.

The mass estimation module 208 receives the vehicle acceleration signal 220 and one or more other signals 232. The other signals 232 may be received from components of the vehicle 100 external to the control module 200 and/or be predetermined values stored within the control module 200. The other signals 232 include, but are not limited to, engine torque, current transmission gear, torque converter operating conditions, axle ratio, tire size, an aerodynamic coefficient, vehicle speed, a rolling load of the vehicle, and braking force. The mass estimation module 208 determines vehicle tractive force (e.g. corresponding to tires of the vehicle) based on the engine torque, transmission gear (e.g. including transmission gear ratio and final drive ratio), torque converter operating conditions, axle ratio, and tire size, and/or the vehicle tractive force may be determined elsewhere in the vehicle 100 and provided to the mass estimation module 208 via the other signals 232.

The mass estimation module 208 generates the mass estimate based on the vehicle acceleration signal 220, the tractive force, the aerodynamic coefficient, the vehicle speed, the rolling load of the vehicle, and the braking force and provides the mass estimate to the shift control module 212. For example only, the mass estimation module 208 generates the mass estimate according to:

$$\text{Mass} = \left(\frac{\text{tractive} - (\text{aerocoeff} * speed^2) - \text{rolling} - \text{braking}}{\text{acceleration}}\right)$$

where acceleration corresponds to the vehicle acceleration signal 220, tractive corresponds to the tractive force, aerocoeff corresponds to the aerodynamic coefficient, speed corresponds to the vehicle speed, rolling corresponds to the rolling load of the vehicle, and braking corresponds to the braking force.

For example only, the mass estimation module 208 may initially generate the mass estimate at relatively low vehicle speeds to minimize any effects of the aerodynamic load, and/or while vehicle brakes are not applied to eliminate the braking force term. The initial mass estimate may then be used to refine the value of the aerodynamic coefficient during certain operating conditions (e.g. while driving on flat terrain, while vehicle brakes are not applied, and/or while vehicle acceleration is less than a threshold). For example, the mass estimation module 208 may refine the aerodynamic coefficient by solving for aerocoeff according to:

$$\text{aerocoeff} * speed^2 + \text{rolling} = \text{tractive}.$$

The shift control module 212 receives the grade and mass estimates, as well as one or more other signals 240, and controls one or more operating parameters of the transmission 116 based on the grade and mass estimates and the other signals 240. The other signals 240 may include, but are not limited to, an altitude of the vehicle. For example, the shift control module 212 controls a shift schedule or shift pattern based on the grade and mass estimates to improve vehicle performance and/or fuel economy in view of a mass of the vehicle 100 and a current grade of the vehicle 100 (e.g. due to terrain). In other words, the shift control module 212 uses the grade and mass estimates, to adapt performance of the vehicle 100 to various loading and terrain conditions.

The vehicle 100 may operate according to a first shift schedule (e.g. a default shift schedule) during normal operation. The shift control module 212 selects between the first shift schedule and one or more other shift schedules based on the grade and mass estimates. For example, when the grade estimate is greater than or equal to a first grade threshold (i.e. the grade estimate indicates that the vehicle 100 is driving on a predetermined grade), the shift control module 212 selects a second shift schedule, and controls the transmission 116 according to the second shift schedule. In other words, the shift control module 212 compares the grade estimate to the first grade threshold, and selects the second shift schedule in response to the grade estimate being greater than or equal to the first grade threshold. The shift control module 212 may select between additional shift schedules (e.g. a third shift schedule) based on other grade thresholds.

For example, the shift control module 212 selects the first shift schedule when the grade estimate is less than the first grade threshold, selects the second shift schedule when the grade estimate is greater than or equal to the first grade threshold and less than a second grade threshold, and selects the third shift schedule when the grade estimate is greater than or equal to the second grade threshold. The selected shift schedule determines shift points of the transmission 116.

The shift control module 212 selects between the first and other shift schedules further based on the mass estimate. For example, when the mass estimate is greater than a first mass threshold, the shift control module 212 selects the second shift schedule (or a fourth shift schedule), and controls the transmission 116 according to the second shift schedule. In other words, the shift control module 212 may select between the same shift schedules corresponding to the grade estimates, and/or select between a set of different shift schedules corresponding to the mass estimates. The shift control module 212 may select additional shift schedules based on respective additional mass thresholds.

A vehicle may include a tow/haul feature that allows a driver to manually select a tow/haul shift schedule (e.g. a shift schedule advantageous for towing and/or hauling). The shift control module 212 of the present disclosure may automatically select the tow/haul shift schedule based on the mass and/or grade estimates (e.g. when the mass estimate is greater than the first mass threshold). For example only, the second, third, or fourth shift schedule may correspond to the tow/haul shift schedule. Accordingly, the driver is not required to manually select the tow/haul shift schedule because the shift control module 212 automatically detects conditions indicative of towing and/or hauling and selects the tow/haul shift schedule.

The shift control module 212 may select one of the shift schedules to control grade braking based on the grade and mass estimates. During grade braking the shift control module 212 controls the transmission 116 to downshift to induce engine braking to slow the vehicle 100. For example, when the grade estimate indicates that the vehicle 100 is on a steep downhill grade (e.g. the grade is a downhill grade greater than or equal to a first grade braking threshold), the shift control module 212 may select a first grade braking shift schedule. The shift control module 212 may select additional grade braking shift schedules based on additional respective grade braking thresholds. For example only, the additional grade braking shift schedules may correspond to more aggressive grade braking for increasingly steeper downhill grades.

The shift control module 212 may also select between the grade braking shift schedules further based on the mass estimates. For example, the shift control module 212 may select the first grade braking threshold when the grade estimate is greater than or equal to a first grade braking threshold but less than a second grade braking threshold. The shift control module 212 selects a second grade braking shift schedule that is more aggressive than the first grade braking shift schedule when the grade estimate is greater than the second grade braking threshold. However, the shift control module 212 may also select the second grade braking shift schedule when the grade estimate is greater than or equal to a first grade braking threshold and less than a second grade braking threshold, and the mass estimate is greater than grade braking mass threshold. In other words, the mass estimate may influence how the shift control module 212 selects between the grade braking thresholds.

The shift control module 212 may select one of the shift schedules to control upshifts (e.g. to delay upshifts) based on the grade and mass estimates. For example, when the grade estimate indicates that the vehicle 100 is on a steep uphill grade (e.g. the grade is an uphill grade greater than or equal to an upshift control grade threshold), the shift control module 212 may select a first upshift control shift schedule. Accordingly, the shift control module 212 prevents an upshift that would result in poor performance on a steep uphill grade. Similarly, the shift control module 212 may select one of the shift schedules to control upshifts when the mass estimate is greater than an upshift control mass threshold. Accordingly, the shift control module 212 prevents an upshift that would result in poor performance due to high vehicle mass (e.g. a high towing or hauling mass).

The shift control module 212 may also gradually transition between different shift schedules and/or adjust a current shift schedule based on the grade and mass estimates instead of discretely switching between different shift schedules. For example, instead of selecting between a first shift schedule and one or more other shift schedules based on the grade and mass estimates, the shift control module 212 may operate according to the first shift schedule and adjust the first shift schedule based on the grade and mass estimates. Adjusting the first shift schedule includes, for example only, applying one or more variable offsets (e.g., shift time offsets) to the first shift schedule. The variable offsets may be based on the grade and mass estimates. The variable offsets may be further based on one or more other values such as the altitude of the vehicle. The one or more other values may correspond to measured and/or calculated values. In this manner, the shift control module 212 may adjust the first shift schedule according to the variable offsets and/or gradually transition the first shift schedule to a second shift schedule incrementally by using the variable offsets.

Figure 3:
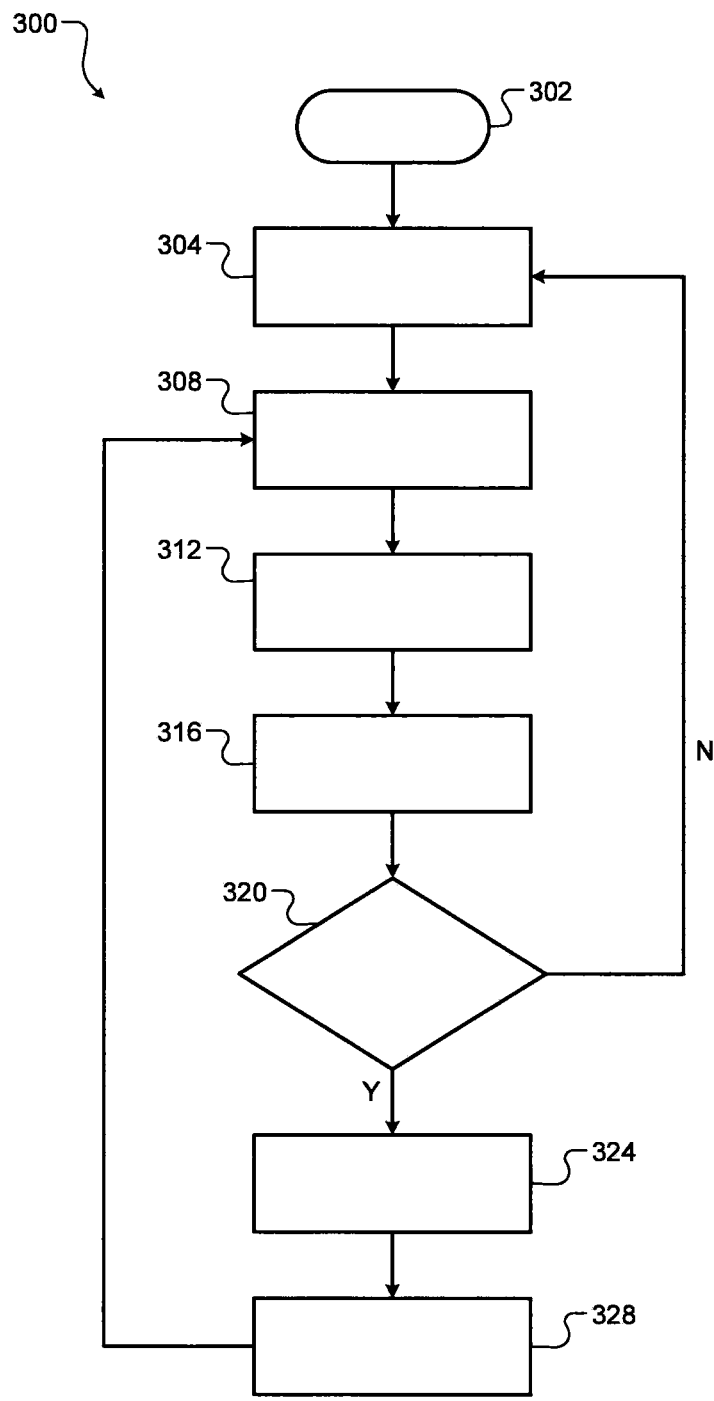
FIG. 3 is a flow diagram illustrating steps of a grade and mass estimation method according to the present disclosure.

Referring now to FIG. 3, a vehicle grade and mass estimation method 300 begins at 302. At 304, the method 300 operates according to a first (e.g., default) shift schedule). At 308, the method 300 generates a vehicle acceleration signal (e.g. using an onboard accelerometer). At 312, the method 300 determines a grade estimate based on the vehicle acceleration signal. At 316, the method 300 determines a mass estimate based on the vehicle acceleration signal. At 320, the method 300 compares the grade and the mass to one or more thresholds and determines whether the grade estimate or the mass estimate is greater than or equal to at least one of the thresholds. If true, the method 300 continues to 324. If false, the method 300 continues to 304 and operates according to the first shift schedule.

At 324, the method 300 selects between a plurality of shift schedules and/or adjusts a current shift schedule based on the grade, the mass, and the one or more thresholds. At 328, the method 300 operates according to the selected shift schedule and continues to 308. The method 300 continues to select between the plurality of shift schedules from 308 to 328 until the vehicle acceleration signal indicates that mass and grade conditions are suitable for a return to the first shift schedule at 304.

The broad teachings of the disclosure can be implemented in a variety of forms. Therefore, while this disclosure includes particular examples, the true scope of the disclosure should not be so limited since other modifications will become apparent to the skilled practitioner upon a study of the drawings, the specification, and the following claims.

What is claimed is:

1. A system comprising:
    a grade estimation module that receives an accelerometer value and generates a grade estimate based on the accelerometer value, wherein the accelerometer value corresponds to acceleration of a vehicle and the grade estimate corresponds to a grade of the vehicle;
    a mass estimation module that receives the accelerometer value and generates a mass estimate based on the accelerometer value, wherein the mass estimate corresponds to a mass of the vehicle; and
    a shift control module that:
        selects one of a plurality of shift schedules based on at least one of the grade estimate and the mass estimate;
        adjusts the selected one of the plurality of shift schedules based on at least one of the grade estimate and the mass estimate; and
        controls a transmission of the vehicle based on the one of the plurality of shift schedules.

2. The system of claim 1 further comprising an accelerometer that generates the accelerometer value.

3. The system of claim 1 wherein the grade estimation module generates the grade estimate based on the accelerometer value, a rate of change of vehicle speed, and a gravitational constant.

4. The system of claim 1 wherein the grade estimation module generates the grade estimate according to $$\text{Grade }\% = \left(\arctan\left(\sin\left(\frac{(\text{acceleration} - \text{rate})}{grav}\right)\right)\right) * 100,$$

wherein grade % corresponds to the grade estimate, acceleration corresponds to the accelerometer value, rate corresponds to a rate of change of vehicle speed, and gray corresponds to a gravitational constant.

5. The system of claim 1 wherein the mass estimation module generates the mass estimate based on the accelerometer value, tractive force of the vehicle, an aerodynamic coefficient of the vehicle, a speed of the vehicle, a rolling load of the vehicle, and braking force of the vehicle.

6. The system of claim 1 wherein the mass estimation module generates the mass estimate according to $$\text{Mass} = \left(\frac{\text{tractive} - (\text{aerocoeff} * speed^2) - \text{rolling} - \text{braking}}{\text{acceleration}}\right),$$

where mass corresponds to the mass estimate, tractive corresponds to tractive force of the vehicle, aerocoeff corresponds to an aerodynamic coefficient of the vehicle, speed corresponds to a speed of the vehicle, rolling corresponds to a rolling load of the vehicle, braking corresponds to a braking force of the vehicle, and acceleration corresponds to the accelerometer value.

7. The system of claim 1 wherein the shift control module at least one of selects and adjusts the one of the plurality of shift schedules in response to the grade estimate being greater than or equal to a threshold.

8. The system of claim 1 wherein the shift control module at least one of selects and adjusts the one of the plurality of shift schedules in response to the mass estimate being greater than or equal to a threshold.

9. The system of claim 1 wherein the shift control module at least one of selects and adjusts the one of the plurality of shift schedules in response to the grade estimate being greater than or equal to a first threshold and the mass estimate being greater than or equal to a second threshold.

10. The system of claim 1 wherein the selected one of the plurality of shift schedules corresponds to one of a tow/haul shift schedule and a grade braking shift schedule.

11. A method comprising:
    receiving an accelerometer value;
    generating a grade estimate based on the accelerometer value, wherein the accelerometer value corresponds to acceleration of a vehicle and the grade estimate corresponds to a grade of the vehicle;
    generating a mass estimate based on the accelerometer value, wherein the mass estimate corresponds to a mass of the vehicle;
    selecting one of a plurality of shift schedules based on at least one of the grade estimate and the mass estimate;
    adjusting the selected one of the plurality of shift schedules based on at least one of the grade estimate and the mass estimate; and
    controlling a transmission of the vehicle based on the one of the plurality of shift schedules.

12. The method of claim 11 further comprising generating the accelerometer value using an accelerometer.

13. The method of claim 11 further comprising generating the grade estimate based on the accelerometer value, a rate of change of vehicle speed, and a gravitational constant.

14. The method of claim 11 further comprising generating the grade estimate according to $$\text{Grade }\% = \left(\arctan\left(\sin\left(\frac{(\text{acceleration} - \text{rate})}{grav}\right)\right)\right) * 100,$$

wherein grade % corresponds to the grade estimate, acceleration corresponds to the accelerometer value, rate corresponds to a rate of change of vehicle speed, and gray corresponds to a gravitational constant.

15. The method of claim 11 further comprising generating the mass estimate based on the accelerometer value, tractive force of the vehicle, an aerodynamic coefficient of the vehicle, a speed of the vehicle, a rolling load of the vehicle, and braking force of the vehicle.

16. The method of claim 11 further comprising generating the mass estimate according to $$\text{Mass} = \left(\frac{\text{tractive} - (\text{aerocoeff} * speed^2) - \text{rolling} - \text{braking}}{\text{acceleration}}\right),$$

where mass corresponds to the mass estimate, tractive corresponds to tractive force of the vehicle, aerocoeff corresponds to an aerodynamic coefficient of the vehicle, speed corresponds to a speed of the vehicle, rolling corresponds to a rolling load of the vehicle, braking corresponds to a braking force of the vehicle, and acceleration corresponds to the accelerometer value.

17. The method of claim 11 further comprising at least one of selecting and adjusting the one of the plurality of shift schedules in response to the grade estimate being greater than or equal to a threshold.

18. The method of claim 11 further comprising at least one of selecting and adjusting the one of the plurality of shift schedules in response to the mass estimate being greater than or equal to a threshold.

19. The method of claim 11 further comprising at least one of selecting and adjusting the one of the plurality of shift schedules in response to the grade estimate being greater than or equal to a first threshold and the mass estimate being greater than or equal to a second threshold.

20. The method of claim 11 wherein the one of the plurality of shift schedules corresponds to one of a tow/haul shift schedule and a grade braking shift schedule.

\* \* \* \* \*